Dec. 29, 1936.  A. F. DE VINEY  2,065,662
WELDING APPARATUS
Filed April 18, 1932   2 Sheets-Sheet 1
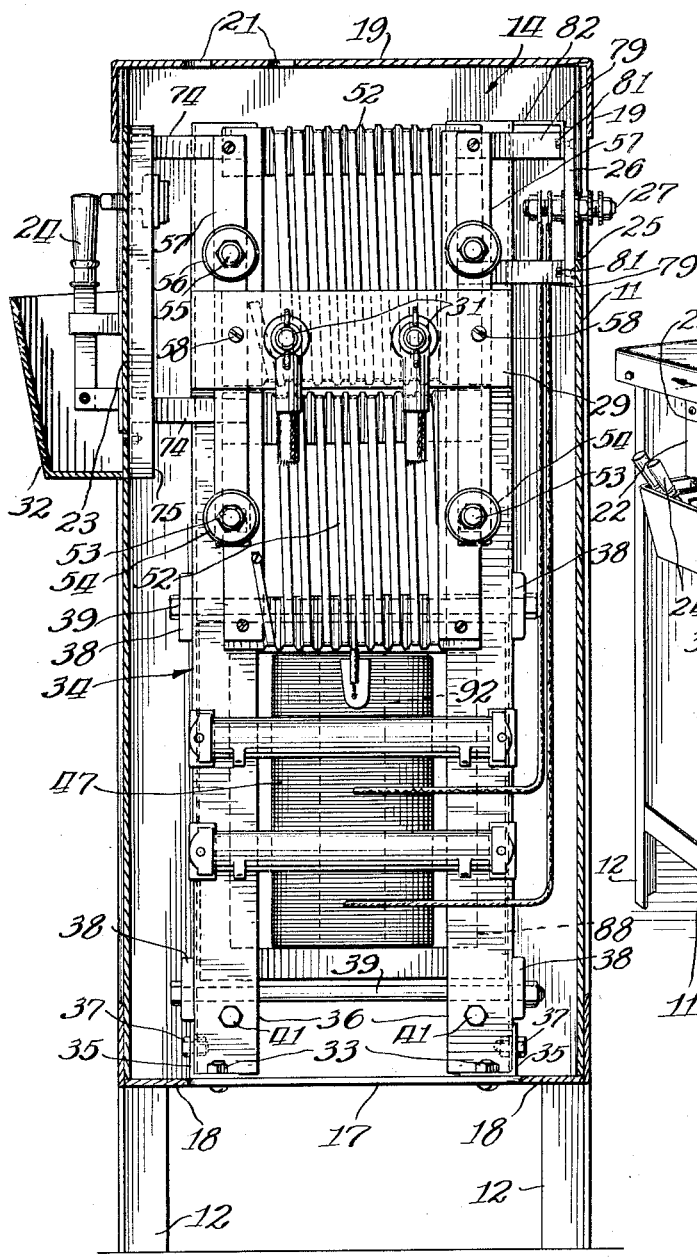
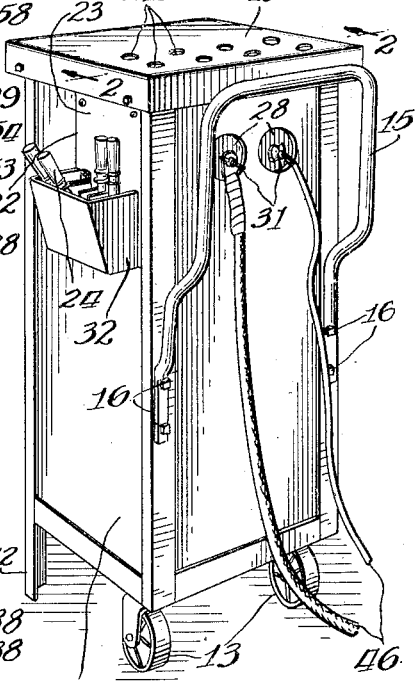
Inventor:
Albert F. DeViney
By Williams, Bradbury,
McCaleb & Hinkle
Attys.

Dec. 29, 1936.     A. F. DE VINEY     2,065,662
WELDING APPARATUS
Filed April 18, 1932     2 Sheets-Sheet 2
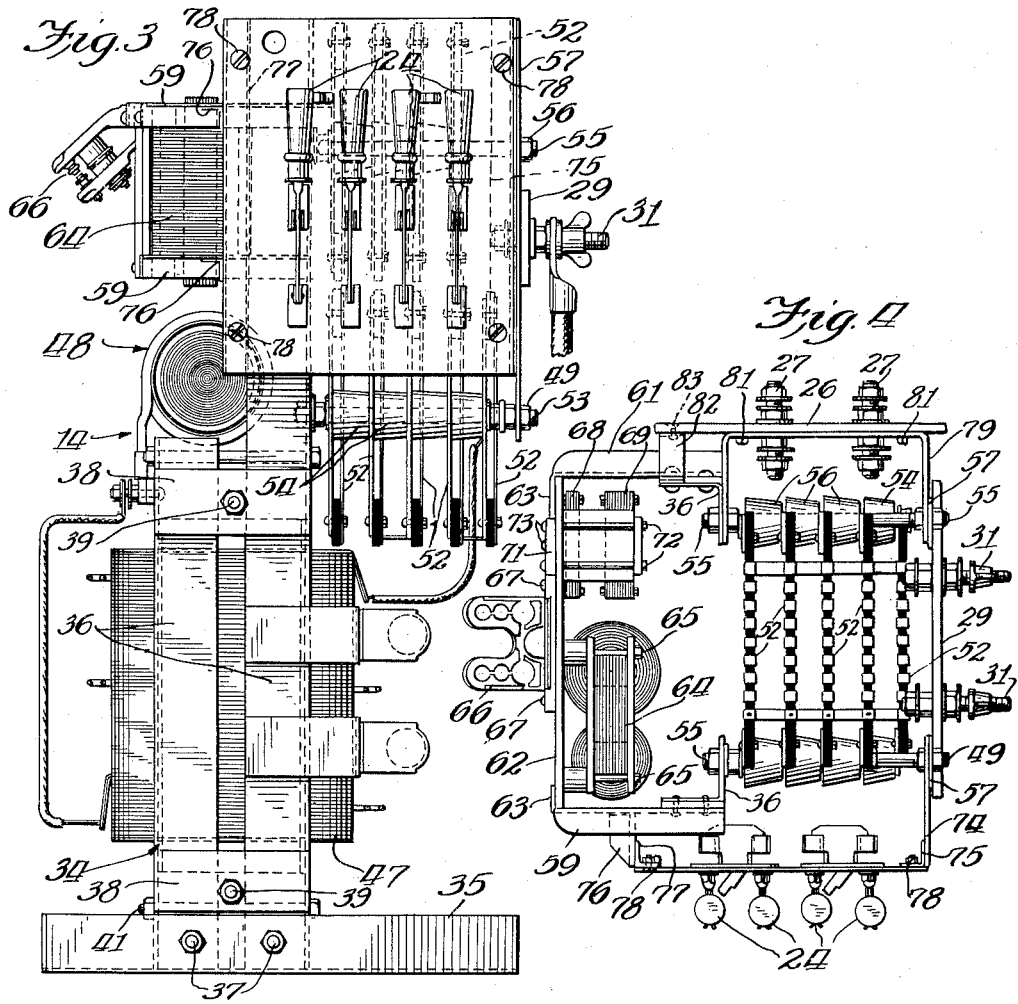
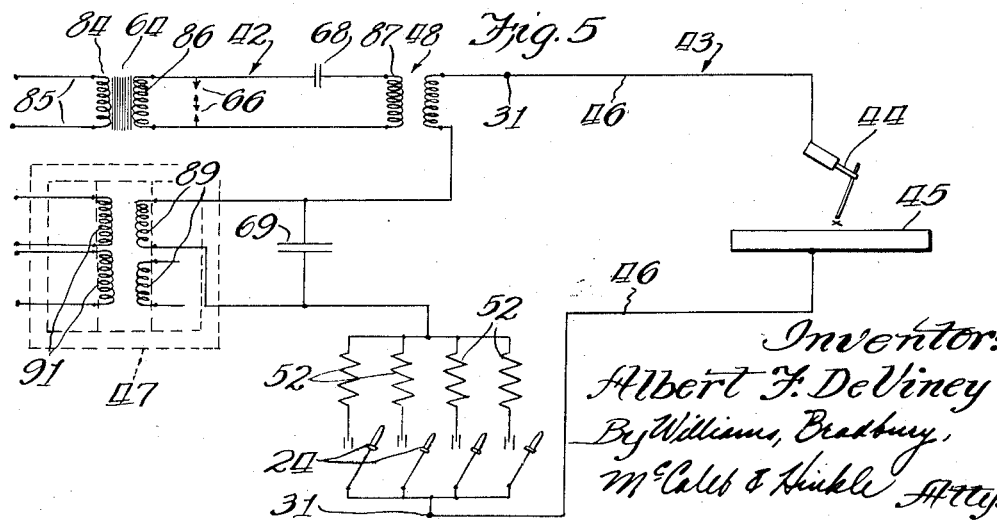
Inventor:
Albert F. DeViney
By Williams, Bradbury,
McCaleb & Hinkle Attys.

Patented Dec. 29, 1936

2,065,662

UNITED STATES PATENT OFFICE 2,065,662

WELDING APPARATUS

Albert F. De Viney, Berwyn, Ill.

Application April 18, 1932, Serial No. 605,975

2 Claims. (Cl. 219—8)

This invention relates in general to welding. It has more particular reference to a novel and improved welder of the semi-portable class.

An object of the invention is the provision of a novel and improved welding system that may be readily assembled in a semi-portable casing or housing for convenience in moving and removing the welder to desired locations of operation.

One object of the invention is the provision of such a novel welding system that may be assembled as a compact unit and removably inserted in a housing or casing which may be rolled to any convenient location.

A further object of the invention is the provision of such a semi-portable welder wherein the welding apparatus is so arranged in a housing therefor that the apparatus most likely to become heated in the use of the apparatus is so positioned relatively to the other apparatus that the heat therefrom will not materially affect such other apparatus.

The invention has as another object the association of a high frequency source of energy with a relatively low frequency source of energy whereby the high frequency energy is employed to start the welding arc and to maintain a relatively low resistance path for the welding energy during welding.

Other objects and advantages of the invention will be apparent from the following description and from the accompanying drawings, in which similar characters of reference indicate similar parts throughout the several views, and in which Fig. 1 is a perspective view of my novel welder embodying the features of the invention;

Fig. 2 is an enlarged section taken substantially on the line 2—2 of Fig. 1;

Fig. 3 is an elevation of the welding apparatus removed from the cabinet or casing;

Fig. 4 is a plan view of the welding apparatus shown in Fig. 3; and

Fig. 5 is a schematic wiring diagram of my welder.

In order to accomplish the foregoing objects, I provide a casing or housing 11, supported by legs 12 and casters 13 for carrying a unitary welder or welding assembly 14 therein. The casters 13 facilitate moving the encased welder from place to place by tilting the casing and rolling it as desired, a handle 15 being secured as at 16 to the casing to readily permit such tilting and moving or rolling of the welder.

The casing 11 may be of any suitable construction providing draft or ventilating means to cool the welder while in use. As illustrated in Figs. 1 and 2, I effect this ventilation by providing the cabinet with an open bottom 17 constructed of any suitable material, such as angles or angle pieces 18 and a top or cover 19 having a plurality of apertures 21 therethrough. In this manner I provide the draft through the casing to cool the welder.

The side walls of the casing are cut away near the top thereof as at 22 to accommodate a control panel 23 carrying a plurality of control switches 24, as at 25, to accommodate a terminal panel 26 carrying the welder or terminal binding posts 27, and as at 28 to accommodate a terminal panel 29 carrying output or welder terminals or binding posts 31. A suitable switch guard 32 substantially encloses the control switches 24.

My unitary welder or welding assembly 14 is adapted to be inserted into the casing 11 from the top and to be detachably secured therein by means of bolt and nut assemblies 33 at the bottom 17 of the casing so that the welder may be removed for inspection, repairs, or replacement of parts simply by removing the bolts and nuts 33.

The welder comprises a frame or chassis generally indicated by the reference character 34 of sufficient strength and rigidity to carry the welding apparatus which is so arranged thereon as to cooperate with the draft of the casing in cooling the apparatus. In other words, the apparatus which is likely to become heated most during the operation of the welder is placed near the top of the chassis so that the heat therefrom will not materially affect the other apparatus, but will be dissipated through the apertures 21 in the cover.

This improved chassis as illustrated in Figs. 2, 3, and 4, comprises a base of for example spaced angle pieces 35 and a plurality of for example angle pieces 36 secured by bolt and nut assemblies 37 at opposite sides of the base and upstanding therefrom. One of the angle pieces 36 at each side of the base is shorter than the other angle piece to which it is connected by cross bracing members 38 at the top and bottom of the shorter angles 36. These cross bracing members are held in clamping relation with the angle pieces 36 at opposite sides of the base by through bolts 39 to lend rigidity to the assembly. The shorter angle pieces 36 are secured to the other angle pieces at each side of the base by through bolts 41.

This chassis or frame 34 carries the welding apparatus assembled thereon as a unit and may be removed from the casing by removal of the cover 19 and the bolt and nut assemblies 33 passing through the open bottom 17 and the base angle pieces 35.

As illustrated, I provide a high frequency relatively high voltage generator or source 42 of energy, whereby a high frequency current may be impressed on a welding circuit 43 for starting and maintaining an arc between a welding electrode 44 and the work 45 connected to the output or welding terminals 31 by conductors 46. The high frequency generator 42 is designed to produce an arc between the electrode and the work when the distance therebetween is one-fourth of an inch or less.

A welding transformer 47 is carried between the long and short angle pieces 36 just above the base for supplying the welding energy to the circuit 43 and a repeating coil device 48 is carried just above the shorter angle pieces 36 for coupling the relatively high frequency high voltage generator to the welding circuit 43.

For cooperating with the switches 24 in controlling the welding current, I provide a plurality of grids or resistors 52 which may be nichrome ribbon grids arranged in two banks or batteries near the top of the chassis where the heat incident upon the use of the resistors will be readily dissipated through the apertures 21. The lower bank of resistors 52 is secured at one side of the chassis by means of a through bolt 53 extending from each of the longer angle pieces 36 and being provided with spacers 54 between adjacent resistors 52. The upper bank of resistors 52 is likewise secured to the angle pieces 36 by bolts 55 and spacers 56 above the lower bank.

In order to provide a secure mounting for the terminal panel 29, I secure two vertical frame members 57 on the ends of the bolts 53 and 55 by means of nuts 49 and secure the terminal panel 29 to these two members 57 by means of, for example, screws 58.

At the side of the angle pieces 36 opposite the resistors 52, I provide correspondingly spaced upper and lower angle pieces 59 and 61 suitably secured to each angle 36 above the repeating coil device 48. The unsecured ends of the angle pieces 59 and 61 are connected or tied together by tie members 62 which are secured to the ends of the angle pieces 59 and 61 by, for example, welding inturned ends 63 of the angle members to the tie members. This construction provides an open sub-frame or chassis.

This open sub-frame or chassis is employed for mounting a step-up transformer 64 secured to the tie members 62 by bolts 65, a multi-point spark gap device 66 secured to the upper tie member 62 outside of the sub-frame by means of bolts or rivets 67 and a plurality of condensers 68 and 69 secured to a panel 71 by bolts 72, the panel 71 extending between the upper and lower tie members 62 to which the panel is secured by bolts 73.

The switch panel 23 is supported by one of the vertical frame members 57 and the spaced angle pieces 59 to which the panel 23 is attached by strips 74 welded to the member 57 and to an angle member 75 and by angles or strips 76 welded to the angle pieces 59 and to an angle member 77, the panel 23 carrying the switches 24 being secured to the angle members 75 and 77 by means of mounting bolt and nut assemblies 78. I provide substantially U-shaped brackets 79 welded to the angle 36 at the side of the chassis opposite the switch panel 23 and to one of the vertical frame members 57 and to these brackets I attach the input terminal panel 26 by means of bolt and nut assemblies 81. The panel 26 may be further supported by brackets 82 riveted or otherwise suitably secured to the angle piece 36 and secured to the panel 26 by screws 83.

Thus, a semi-portable welder is so constructed and arranged that a high frequency relatively high voltage current may be impressed across or between the electrode 44 and the work 45 to start and to maintain an arc therebetween whereby a conducting medium is provided for the welding current between the work and the electrode, the high frequency energy being by-passed or shunted across the welding transformer 47 by means of the condenser 69.

The source 42 of energy includes the step-up transformer 64 having a primary winding 84 connectible by a line 85 to a suitable source of electrical energy, not shown. The transformer 64 also has a secondary winding 86 which forms a part of an oscillatory circuit with the multiple spark gap 66 connected across the circuit and the capacity or condenser 68 in series with the winding 86 and the coil 87 of the repeating coil device 48.

It has been suggested for arc welding to use the wellknown core type of transformer or a transformer having a closed core with the primary and secondary windings at opposite sides thereof. Such a transformer is characterized by relatively high leakage and is not otherwise satisfactory in that it necessitates the employment of a special transformer having a high reactance or of auxiliary reactances. In order to avoid such objectionable features, I use for the source of welding energy a transformer having a figure eight core 88, a plurality of secondary windings 89 and one or more primary windings 91, the secondary and primary windings 89 and 91 being wound on the middle bar 92 of the core 88, whereby close voltage regulation is obtained so that the full and no load voltages impressed between the work and the electrode are substantially equal. By providing a plurality of secondary windings, more than one welding operation may be done from the same welder. As illustrated in Fig. 5, there are two primary windings in order to permit operating the transformer at say 220 volts by connecting the primaries in parallel and at say 440 volts by connecting the primaries in series.

The primary winding 84 of the step-up transformer 64 and the primary windings 91 of the welding transformer 47 may be connected to the input terminals 27 and may receive energy from the same or different sources. By connecting the primary windings 91 to the input terminals 27 the series and parallel connections of the primary windings to provide this operating voltage as described above, may be easily accomplished by the operator of the welder.

The control and regulating device comprising the switches 24 and the resistors 52 provides for a wide range of adjustment in the welding current. Each switch is connected in series with one or more of the resistors and these switch resistor units are, as shown in Fig. 5, connected in parallel so that by manipulating the switches singly and in various combinations, the desired welding current may be obtained.

In operation the novel welder of my invention may be rolled to the desired location and the input terminals 27 may be connected to a suitable source of energy. The work and a welding electrode are connected to the output or welding terminals 31. When so connected the high frequency current is superimposed on the same leads that carry the welding current and serves to ionize the air gap between the electrode and the work, thereby completing the welding circuit 43.

This ionization by the high frequency current continues during the welding and furnishes a path of substantially constant resistance for the welding current, thereby eliminating the objectionable fluctuations of current so noticeable in other types of welders, and resulting in a greater heat per unit of current.

If the resistance of the arc increases during the welding operation, the welding current decreases. This decrease in welding current results in a decreased potential difference or drop across the resistors 52 and an increase in the potential difference or drop across the air gap between the electrode and the work, thereby raising the welding current to its original value and resulting in a smooth or substantially continuous arc producing an even deposition of the welding metal.

Each secondary winding 89 may be connected to a different welding circuit 43 so that the welder may be employed by more than one operator for welding independently of each other. This multiple welder is made possible by virtue of the high power factor of my transformer 47.

Thus it will be seen that I have produced a welder which will have a high operating efficiency and which will have a wide current range so that it will weld material of various thicknesses. Due to the fact that an arc of very low amperage can be maintained and to the fact that this current is readily adjustable to correspond to the thickness of the material being welded, a good welded joint or bead may be easily obtained.

Having thus described my invention, what I claim as new and desire to secure by Letters Patent of the United States, is:

1. The combination of a semi-portable welder casing having an open bottom and an apertured top to provide a draft passage through said casing, with a welding source of energy, a high frequency source of energy, a bank of control resistors, and an open chassis carrying said welding source of energy at the bottom of said casing, said high frequency source of energy in said casing above said welding source of energy and said bank of resistors at the top of said casing spaced laterally from said high frequency source of energy.

2. In a welder including a low voltage, low frequency source of welding energy and a high frequency, high voltage source of energy, a chassis comprising a supporting base, a pair of upstanding frame members providing mounting means for a portion of said high frequency, high voltage source of energy, and another pair of upstanding frame members adjacent the first said members and extending outwardly beyond said mounting means for carrying portions of said welder likely to be heated in the use thereof to temperatures excessive for other portions of said welder.

ALBERT F. DE VINEY.